Jan. 6, 1925.  1,521,675
H. F. FOWLES
DIRIGIBLE HEADLIGHT
Filed June 3, 1922   2 Sheets-Sheet 1

H. F. Fowles,
INVENTOR
BY Victor J. Evans
ATTORNEY

Jan. 6, 1925.
H. F. FOWLES
DIRIGIBLE HEADLIGHT
Filed June 3, 1922 2 Sheets-Sheet 2
1,521,675
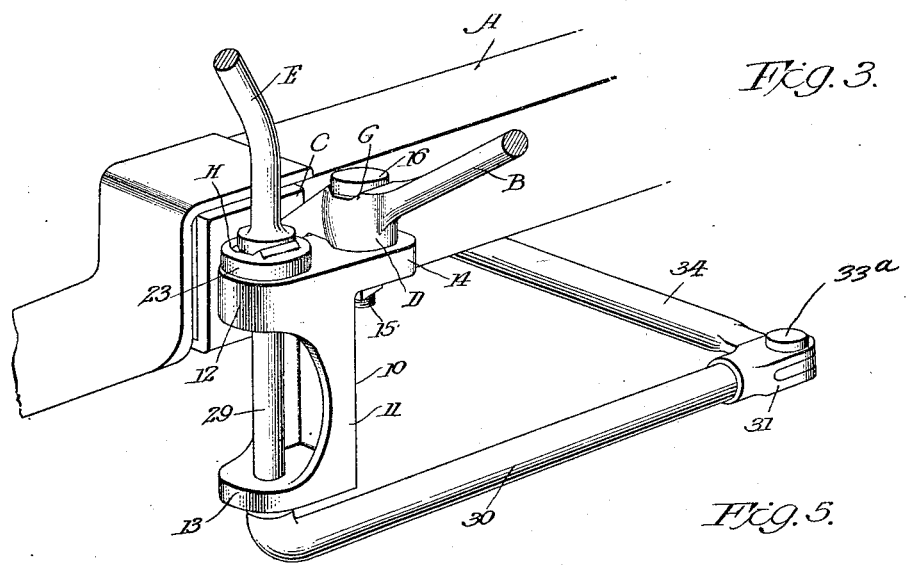
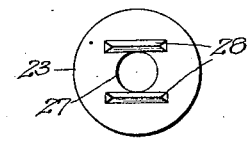
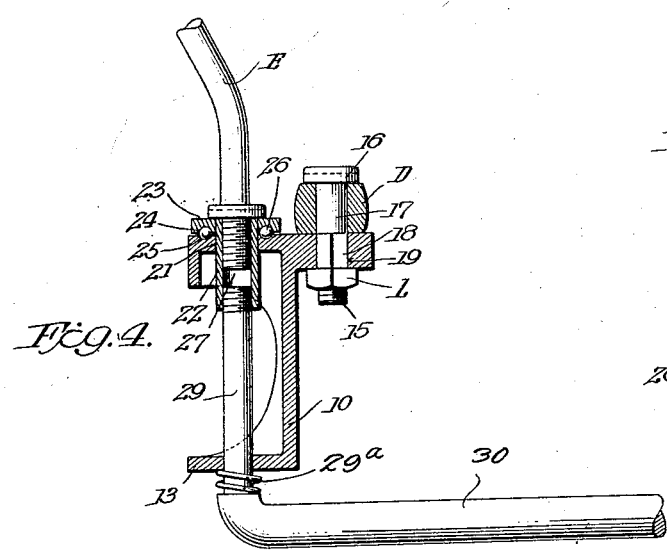
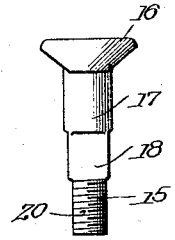
H. F. Fowles
INVENTOR
BY Victor J. Evans
ATTORNEY Patented Jan. 6, 1925.

1,521,675

UNITED STATES PATENT OFFICE.

HENRY F. FOWLES, OF SPOKANE, WASHINGTON.

DIRIGIBLE HEADLIGHT.

Application filed June 3, 1922. Serial No. 565,508.

*To all whom it may concern:*

Be it known that I, HENRY F. FOWLES, a citizen of the United States, residing at Spokane, in the county of Spokane and State of Washington, have invented new and useful Improvements in Dirigible Headlights, of which the following is a specification.

This invention relates to headlight mountings for automobiles and has for its object the provision of a novel device by means of which the headlights of a Ford automobile may be caused to throw the light upon the roadway or within front of a car regardless of whether the car be travelling along a straight road or the going around corners.

An important object is the provision of a headlight mounting which is designed to be secured upon the mud guard holders by means of a fastening element which passes through the hole or socket commonly provided for the securing of the headlight standards, this bracket being provided with novel means for supporting the headlight standards subsequent to their removal from their accustomed place upon the mud guard holder, the bracket member further carrying an operating element which is connected with and moved by the steering arm of the vehicle.

Still another object is the provision of a novel connection between both of the headlights and the steering arm whereby flexibility will be permitted and so that binding of the parts during the coaction thereof will be absolutely prevented.

An additional object is the provision of a device of this character which will be simple and inexpensive in manufacture and installation, highly efficient in use, durable in service, positive in action and a general improvement in the art.

With the above and other objects and advantages in view, the invention consists in the details of construction to be hereinafter more fully described and claimed, and illustrated in the accompanying drawings in which—

Figure 3 is a perspective view showing the arrangement of parts at the left headlight, Figure 4 is a longitudinal section taken through the lens supporting bracket, and Figures 5 and 6 are detail views.

Figure 1:
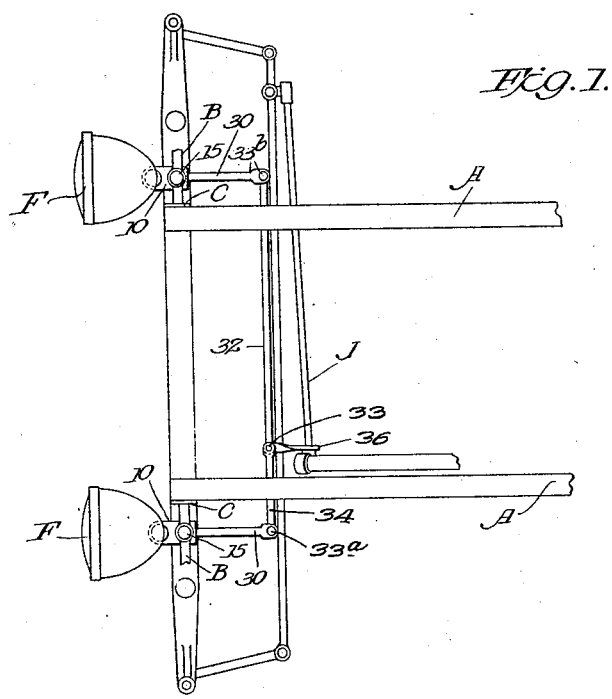
Figure 1 is a top view of the front portion of a Ford automobile equipped with my device.
Figure 2:
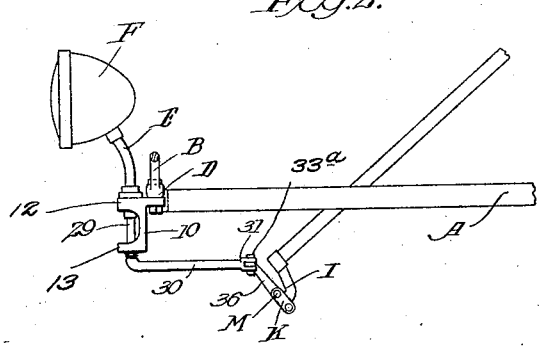
Figure 2 is a side view.

Referring more particularly to the drawings the letter A designates a portion of the frame of an automobile of the Ford type, B designates the front mud guard holder which is formed at its end with a bracket portion C bolted to the frame A and which is formed near the frame with a socket D within which is ordinarily engaged the standard E of the headlamps F. It is well known that the top of this socket portion B is formed with spaced ribs G with which cooperates a flattened or cutaway flange H on the headlamp standard for the purpose of preventing the headlamp standard from having any rotary displacement with respect to the socket of the mud guard holder. The letter I designates the steering arm with which is connected the steering rod J by means of the usual ball and socket connection indicated at K.

In carrying out my invention I remove the headlamp standard E from engagement with the socket D and secure upon the mud guard holders B at each side of the machine a bracket member designated broadly by the numeral 10 and formed preferably as a single casting. This bracket member includes a body 11 which is formed at its upper and lower end with forwardly extending arm portions 12 and 13 respectively and which is also formed at its top portion with a rearwardly extending arm or bearing portion 14. In order to hold the bracket member 10 in position upon the mud guard holder B, I provide a bolt 15 which has opposite sides of its head 16 cutaway as shown in Figure 6 for fitting engagement between the ribs G so that rotation of the bolt will be absolutely prevented. This bolt has a cylindrical portion 17 which fits within the socket D and below this cylindrical portion is formed with a portion 18 which is rectangular in cross-section and which fits within a similarly shaped hole 19 in the rear extension 14 of the bracket 10. The lower extremity of the bolt 15 is reduced and threaded as indicated at 20 and carries the nut L which is ordinarily provided for securing the headlamp standard within the socket B. By this means it will be seen that the bracket 10 will be absolutely rigidly secured with respect to the mud guard holder so that no movement or displacement will be permitted.

The arm 12 of the bracket 10 is formed with a vertical bore 21 within which is rotatably mounted a sleeve 22 which passes through a disk 23 formed in its underside with a ball race 24 which cooperates with a ball race 25 formed in the upper surface of the arm 12, these races having disposed between them a plurality of balls 26.

The sleeve 22 is of course formed with a central bore 27 and is screwed onto the lower threaded end of the standard E. It is to be noticed that the disk 23 is formed with spaced ribs 28 which engage against the oposite flattened portions in the flange H of the standard E so as to prevent rotation of the standard with respect to the disk and sleeve. It is of course obvious that the disk 23 must be engaged upon the sleeve subsequent to screwing the latter onto the standard. Screwed into the lower portion of the sleeve 22 is a vertical stub shaft 29 which is journaled through a suitable hole in the lower arm 13 of the bracket and upon the lower extremity of which is secured a rearwardly extending operating arm 30 which terminates at its rear end in a fork 31.

Surrounding the shaft 29 is a spring $29^a$ which bears against the underside of the arm 13 not only for preventing rattling but for holding the disk 23 down upon the balls 26. This spring also serves to hold the parts firmly together so that the disk 23 and sleeve 22 will turn together.

The structure at both sides of the machine, that is at both headlights is exactly the same and in order to effect simultaneous movement of the headlamps, I provide a connecting rod 32 which extends across the front portion of the machine under the frame thereof and which has one end pivotally connected by a bolt 33, with a link 34 which is pivotally connected at $33^a$ with one fork 31. The other end of the rod 32 is pivotally connected by a bolt $33^b$ with the other fork 31 of the other lamp mechanism. The numeral 36 designates an operating link which is connected with the bolt 33 and which has its other end connected with one of the bolts M which hold the ball socket cap at the connection K.

Assuming that the device has been constructed and assembled as above described, the operation is as follows: When the steering gear of the automobile is operated to turn the front wheels in the one direction or the other and the steering arm I is of course moved, the operating link 36 will impart corresponding movement to the connecting rod 32 and this will result in swinging the links 34 and the arms 30 which are connected with the lower ends of the vertical shaft 29. As these shafts 29 are turned the sleeves 22 carried thereby will also turn and as these sleeves carry the standards E of the headlamps it is apparent that the headlamps will be correspondingly turned so as to throw their light directly upon the roadway in advance of the automobile regardless of the direction of travel thereof. In this way it will be seen that there will always be light upon the road even though the automobile is turning a sharp corner. Owing to the peculiar construction and the mounting of the various parts it will be apparent that there can be no looseness or displacement so that an efficient, positive and quick acting operation will result. Owing to the simplicity of the construction and the fewness of the parts it is apparent that the device may be constructed and installed with very little expense and that there is nothing to get out of order and that the entire mechanism should consequently have a long life and give satisfactory service.

While I have shown and described the preferred embodiment of the invention, it is of course to be understood that I reserve the right to make such changes in the form, construction and arrangement of parts as will not depart from the spirit of the invention or the scope of the subjoined claim.

Having thus described my invention I claim;

In a dirigible headlight mounting, an angular bracket adapted for disposition against the side of a vehicle frame and formed with a rearwardly extending apertured ear disposable beneath the stay rod socket subsequent to the removal of the headlamp standard therefrom, a bolt passing through the socket and through said ear for effecting securing of the bracket, the bracket including upper and lower forwardly extending arms formed with aligning openings, a sleeve rotatably engaged within the opening in the upper arm and having a bore within which is secured the lower end of the lamp standard removed from said socket, a rod journaled through the lower arm of the bracket and having its upper end secured within said sleeve, a rearwardly extending bar on the lower end of said rod, said structure being duplicated at both sides of the vehicle, a bridle bar connecting both of said rearwardly extending bars, and means connecting said bridle bar with the steering rod of the vehicle.

In testimony whereof I affix my signature.

HENRY F. FOWLES.